United States Patent
Smith (10) Patent No.: US 8,875,578 B2
(45) Date of Patent: Nov. 4, 2014

(54) ELECTRONIC DAMPER CIRCUIT FOR MEMS SENSORS AND RESONATORS

(75) Inventor: Eric B. Smith, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 309 days.

(21) Appl. No.: 13/281,928

(22) Filed: Oct. 26, 2011

(65) Prior Publication Data

US 2013/0104656 A1 May 2, 2013

(51) Int. Cl.
*G01P 15/13* (2006.01)
*G01C 19/56* (2012.01)
*G01P 15/125* (2006.01)
*G01C 19/5726* (2012.01)
*G01P 15/097* (2006.01)
*G01P 1/00* (2006.01)
*G01P 15/08* (2006.01)

(52) U.S. Cl.
CPC .......... *G01P 15/097* (2013.01); *G01C 19/5726* (2013.01); *G01P 15/125* (2013.01); *G01P 1/003* (2013.01); *G01P 2015/0882* (2013.01)
USPC .................. 73/514.18; 73/504.12; 73/514.32; 73/504.14

(58) Field of Classification Search
USPC ............... 73/514.32, 514.38, 514.36, 514.17, 73/514.18, 504.12, 504.14, 504.04
See application file for complete search history.

(56) References Cited

U.S. PATENT DOCUMENTS

| | | | | |
|---|---|---|---|---|
| 4,951,508 A | * | 8/1990 | Loper et al. ................ | 73/504.13 |
| 5,594,168 A | * | 1/1997 | Terajima .................... | 73/496 |
| 6,439,050 B1 | * | 8/2002 | Musalem et al. .......... | 73/504.12 |
| 6,860,150 B2 | * | 3/2005 | Cho ........................... | 73/504.12 |
| 6,930,487 B2 | * | 8/2005 | North, Jr. ................... | 324/457 |
| 7,401,515 B2 | * | 7/2008 | Weber ........................ | 73/504.12 |
| 7,481,111 B2 | * | 1/2009 | Caminada et al. ......... | 73/514.18 |
| 7,694,561 B2 | * | 4/2010 | Steinlechner ............. | 73/504.02 |
| 8,141,426 B2 | * | 3/2012 | Ikeuchi et al. ............. | 73/514.32 |
| 8,322,216 B2 | * | 12/2012 | Yu et al. .................... | 73/514.32 |
| 8,375,788 B2 | * | 2/2013 | Robert ....................... | 73/504.12 |

OTHER PUBLICATIONS

Boser, Bernhard E., and Howe, Roger T., "Surface Micromachined Accelerometers," IEEE 1995 Custom Integrated Circuits Conference, May 1-4, 1995, pp. 337-344.

Cagdaser, Baris, and Bhave, Sunil, "2nd and 3rd Order Sigma-Delta Force-Feedback for MEMS Gyroscopes," Dept. of Electrical Engineering and Computer Sciences, Univ. of CA at Berkeley, downloaded Oct. 26, 2011 URL: http://www.eecs.berkeley.edu/~boser/courses/past/247_2000_fa/projects/final/Cagdaser_Ca.pdf, 5 pages.

Johnson, Curtis D., "Accelerometer Principles," from Process Control Instrumentation Technology, 1997, published Mar. 18, 2011, National Instruments, downloaded Jul. 28, 2011, URL: /http://zone.ni.com/devzone/cda/ph/p/id/12, 5 pages.

(Continued)

Primary Examiner — Helen Kwok
(74) Attorney, Agent, or Firm — Abel Law Group, LLP (57) ABSTRACT

An apparatus includes a microelectromechanical system (MEMS) device including a mass anchored to a substrate. The MEMS device is configured to generate an output signal indicative of motion of the mass with respect to the substrate. The MEMS device includes a feedback module configured to provide a control signal to the MEMS device. The control signal is based on the output signal. The MEMS device is configured to apply a damping force to the mass in response to the control signal.

21 Claims, 11 Drawing Sheets

(56) References Cited

OTHER PUBLICATIONS

Kaajakari, Ville, "(Electrical) Equivalent Circuits for Microresonators," a tutorial, downloaded Oct. 26, 2011 URL: http://www.kaajakari.net/~ville/research/tutorials/eq_circ_tutorial.pdf, 6 pages.

Kaajakari, Ville, "Accelerometers," Practical MEMS, Small Gear Publishing, 2009, Ch. 3, URL: http://www.kaajakari.net/PracticalMEMS, pp. 33-48.

Lemkin, Mark A., et al., "A 3-Axis Force Balanced Accelerometer Using a Single Proof-Mass," 1997 International Conference on Solid-State Sensors and Actuators, Jun. 16-19, 1997, pp. 1185-1188.

Merta, J., et al., "Regulation of a Microcantilever Response by Force Feedback," 1993 American Institute of Physics, downloaded May 16, 2007 at URL: http://apl.aip.org/apl/copyright.jsp, pp. 2344-2346.

Raman, J. et al., "A Digitally Controlled MEMS Gyroscope with Unconstrained Sigma-Delta Force-Feedback Architecture," MEMS 2006, Istanbul, Turkey, Jan. 22-26, 2006, pp. 710-713.

* cited by examiner

ELECTRONIC DAMPER CIRCUIT FOR MEMS SENSORS AND RESONATORS

BACKGROUND

1. Field of the Invention

The invention is related to microelectromechanical systems (MEMS) and more particularly to MEMS sensors and resonators.

2. Description of the Related Art

Figure 1A:
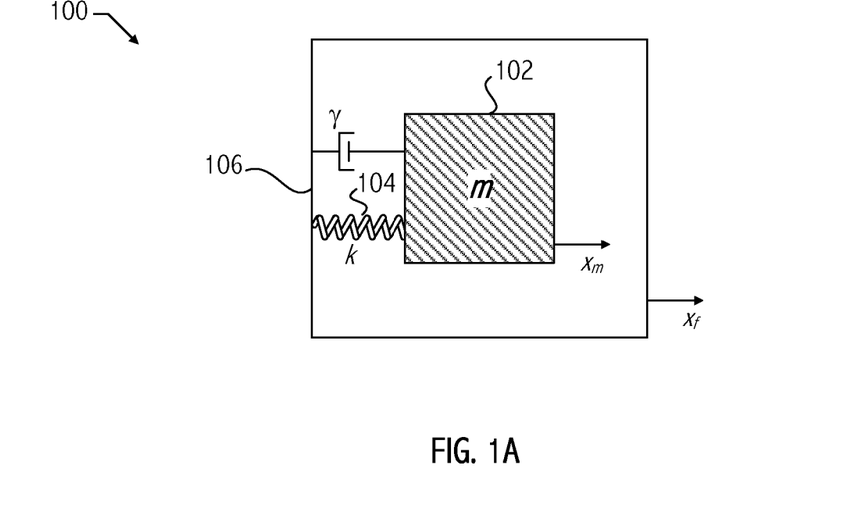
FIG. 1A illustrates a model of an exemplary MEMS accelerometer.

In general, microelectromechanical systems (MEMS) are very small mechanical devices driven by electricity. Typical MEMS devices include resonators, sensors, and actuators, which may be used in various applications, e.g., accelerometers and gyroscopes. The mechanical systems of those MEMS devices may be modeled as a harmonic resonator (FIG. 1) having a natural or resonance frequency, $$\omega_0 = \sqrt{\frac{k}{m}},$$

and a quality factor, $$Q = \frac{\omega_0 m}{\gamma},$$

where k is a spring constant, m is mass, and γ is a damping coefficient. The quality factor of a resonator is a dimensionless parameter that describes how under-damped an oscillator or resonator is, or equivalently, characterizes the bandwidth of the resonator relative to its center frequency. A higher Q indicates a lower rate of energy loss relative to the stored energy of the resonator, i.e., the oscillations die out more slowly. For a sinusoidally driven resonator, an increased Q corresponds to greater amplitudes of resonation, but a smaller range of frequencies around the resonant frequency for which it resonates (i.e., smaller bandwidth). Although in some applications higher selectivity (i.e., higher Q) is a critical design parameter for a MEMS device, in other applications a wider bandwidth (i.e., lower Q) is a critical design parameter.

SUMMARY

In at least one embodiment of the invention, an apparatus includes a microelectromechanical system (MEMS) device including a mass suspended from a substrate. The MEMS device is configured to generate an output signal indicative of motion of the mass with respect to the substrate. The MEMS device includes a feedback module configured to provide a control signal to the MEMS device. The control signal is based on the output signal. The MEMS device is configured to apply a damping force to the mass in response to the control signal.

In at least one embodiment of the invention, a method includes damping a mass suspended from a substrate of a microelectromechanical system (MEMS) device. The damping is based on sensed displacements of the mass with respect to a substrate of the MEMS device. In at least one embodiment, the damping includes generating a feedback signal based on the sensed motion and applying a damping force to the mass of the MEMS device in response to the feedback signal.

In at least one embodiment of the invention, an apparatus includes a microelectromechanical system (MEMS) device including a mass suspended from a substrate. The MEMS device is configured to sense motion of the mass with respect to a substrate of the MEMS device and configured to apply a damping force to the mass in response to a control signal. The damping force is determined according to a velocity of the mass.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

In at least one embodiment of an electromechanical system (e.g., a MEMS accelerometer) including a moving mass, an electronic damping technique introduces a damping force that is proportional to the velocity of the moving mass. The electronic damping introduces a damping force ($F_e = -\gamma_e \dot{x} = -\gamma_e dx/dt = -\gamma_e v$, where $\gamma_e$ is an electronic damping coefficient, x is the displacement of the moving mass, and v is the velocity of the moving mass) and increases a total damping force on the moving mass to a force greater than a natural damping force (e.g., $\gamma_n$ is associated with a damping force that is typically generated by gas resistance and/or anchor losses in the MEMS accelerometer). In at least one application of the electromechanical system, the increased damping force (i.e., a total damping force on the moving mass greater than a natural damping force) is desired. For example, in at least one embodiment, the increased damping force introduced by the electronic damping technique widens the mechanical bandwidth in an application having a target mechanical bandwidth that is greater than the mechanical bandwidth resulting from natural damping forces. In at least one embodiment, the increased damping force introduced by the electronic damping technique dampens resonant motion of a mass to prevent overshoot or ringing that may be catastrophic to the associated feedback control system.

In at least one embodiment of the electronic damping technique, capacitive sensing and capacitive transduction is used. In general, capacitor current (i) is represented as follows:

$$i = C\frac{dV}{dt} + V\frac{dC}{dt},$$

where V is the voltage over the capacitor and C is the capacitance. The first term is the current due to a time varying voltage and the second term is the current due to the time variations of the capacitance value. Various embodiments of the electronic damping technique drive a movable capacitor with a modulation signal having a frequency ($f_{SENSE}$) to directly sense C using the $$C\frac{dV}{dt}$$

component of capacitor current. Those embodiments of the electronic damping technique generate an accelerometer output that is proportional to displacement of the moving mass and differentiate that accelerometer output to generate a control signal proportional to velocity. A capacitive transducer applies a damping force to the moving mass in response to the control signal. Other embodiments of the electronic damping technique use a resonator or an accelerometer driven at resonance. A movable capacitor is driven with a DC voltage and the $$V\frac{dC}{dt}$$

component of capacitor current is sensed. Those embodiments generate an output proportional to velocity, which is used to create a control signal proportional to the velocity that is applied to a capacitive transducer to apply a damping force to the moving mass. Additional details of the various embodiments of the electronic damping technique are described below.

Figure 1B:
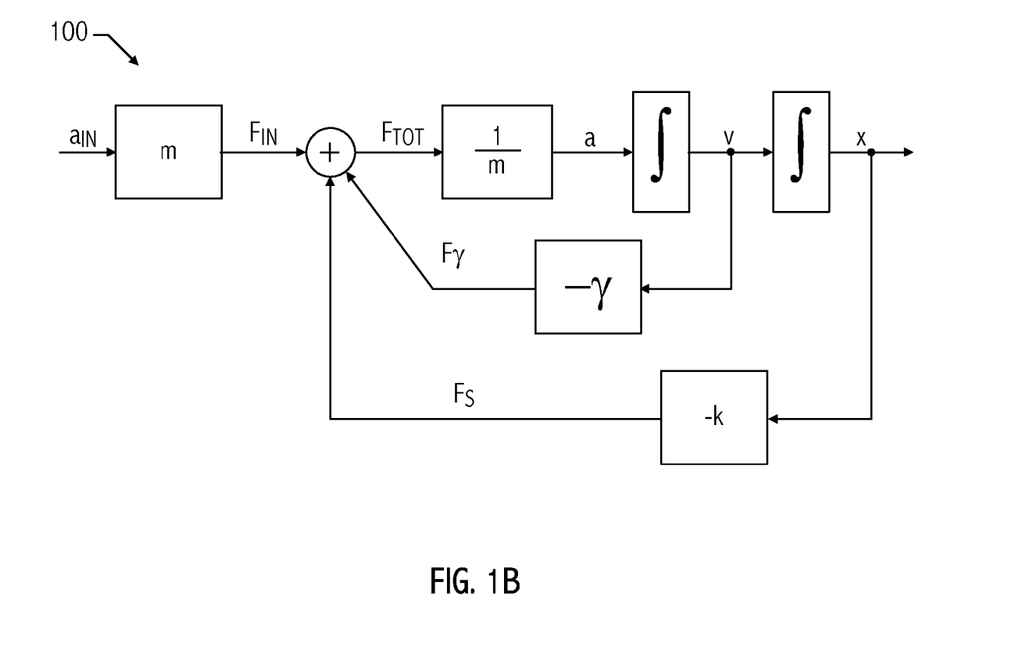
FIG. 1B illustrates another representation of the exemplary MEMS accelerometer of FIG. 1A.

Referring to FIGS. 1A and 1B, a typical accelerometer (e.g., device 100) includes a proof mass (e.g., mass 102) having a mass m anchored to a frame (e.g., frame 106) by a flexible spring (e.g., spring 104) having a spring constant k. Due to mass inertia, motion of proof mass 102 lags motion of frame 106. The difference in displacement of the mass and the frame, e.g., displacement $x=x_f-x_m$, where $x_m$ is the position of the mass and $x_f$ is the position of the frame (e.g., substrate), can be used to determine acceleration of device 100. The total force acting on mass 102 (e.g., $F_{TOT}$) is the sum of the inertial forces acting on mass 102 (e.g., $F_{IN}$) and external forces acting on mass 102 (e.g., damping force, $F_\gamma=-\gamma\dot{x}$, and spring force, $F_S=-kx$), and may be represented as follows:

$$F_{TOT}=m\ddot{x}+\gamma_{tot}\dot{x}+kx,$$

where $\gamma_{tot}$ is the total damping coefficient. In general, a damping force is proportional to the mass velocity $\dot{x}$ (e.g., $F_\gamma=-\gamma\dot{x}$). If there are multiple loss mechanisms affecting the mass, the damping forces sum and the total damping coefficient is:

$$\gamma_{tot}\gamma_1+\gamma_2-\ldots+\gamma_N.$$

The corresponding quality factor is:

$$Q_{TOT} = \frac{\omega_0 m}{\gamma_{tot}}.$$

Figure 2:
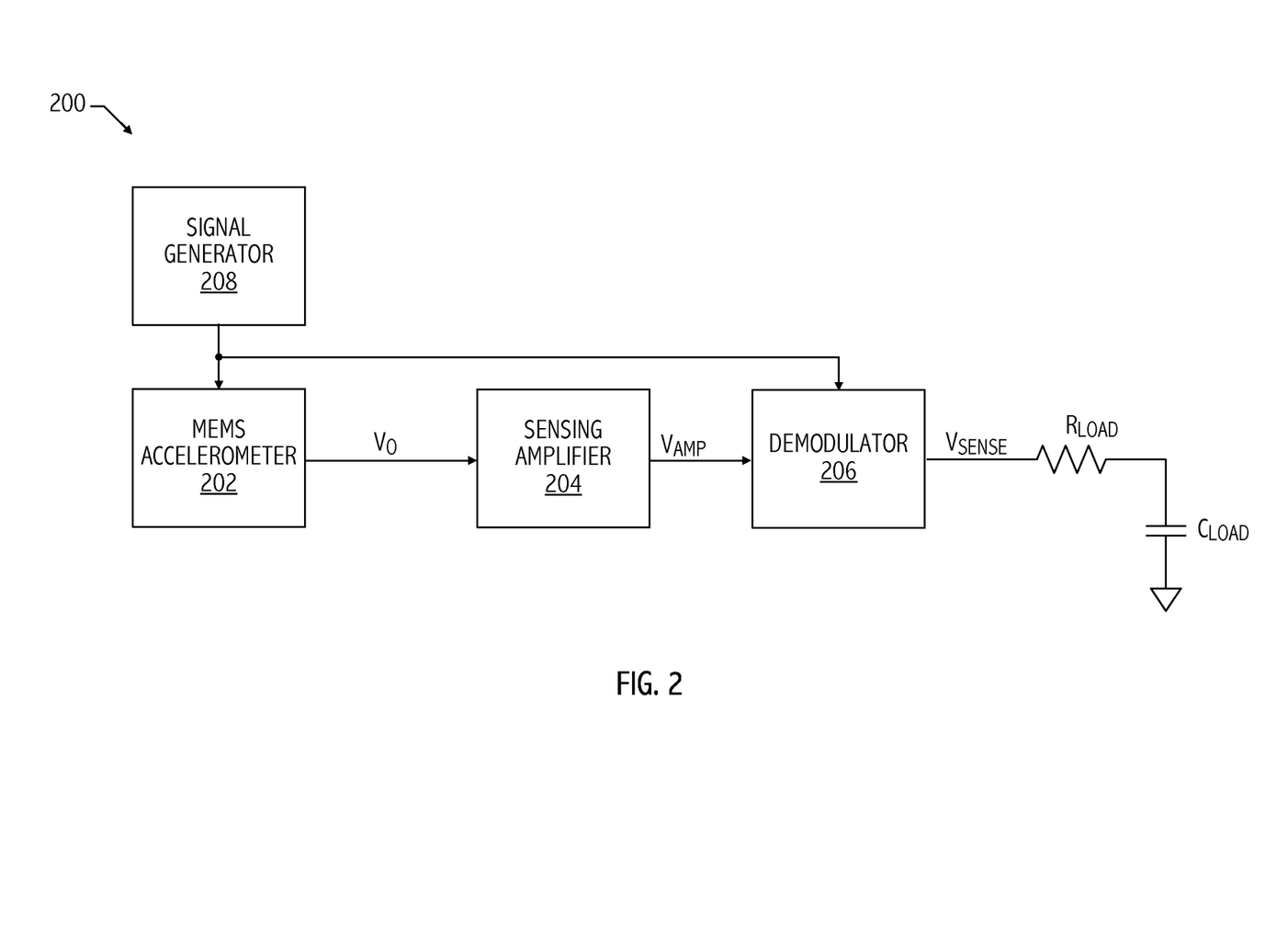
FIG. 2 illustrates a functional block diagram of a typical MEMS accelerometer system.

Referring to FIG. 2, an exemplary sensor system (e.g., system 200) includes a MEMS accelerometer (MEMS accelerometer 202). MEMS accelerometer 202 may be a single axis accelerometer or a multi-axis accelerometer. In at least one embodiment, MEMS accelerometer uses capacitive sensing, i.e., MEMS accelerometer 202 generates an output signal (e.g., $V_O$) indicating a change in capacitance due to mechanical movement (i.e., displacement) of a proof mass with respect to a frame (e.g., package or substrate). In at least one embodiment of MEMS accelerometer 202, the capacitive displacement measurement is carried out using a sensing signal, which is an AC excitation signal having a frequency $f_{SENSE}$ (e.g., 10 kHz<$f_{SENSE}$<1 MHz), and results in an output signal that is characterized by a small current at a high frequency. By measuring displacements using a frequency $f_{SENSE}$ that is greater than a frequency $f_c$ (i.e., the frequency where flicker noise and 1/f noise have amplitudes equal to the amplitude of white noise), effects of low frequency noise on the $V_O$ are reduced or eliminated. In at least one embodiment of system 200, an amplifier (e.g., sensing amplifier 204) gains the output signal and provides the amplified output signal (e.g., $V_{AMP}$) to a demodulator (e.g., demodulator 206), which demodulates the amplified output signal (e.g., by multiplying the amplified output signal with the original excitation signal using a mixer) to obtain a DC signal (i.e., baseband signal, e.g., $V_{SENSE}$) having voltage levels proportional to the displacement of the mass with respect to the frame. In at least one embodiment, a low-pass filter (not shown) is used to reduce or eliminate high frequency components before delivering the signal to a signal processor or other load circuit, which is illustrated by a representative load having $R_{LOAD}$ and $C_{LOAD}$.

In general, air damping or losses due to the flow of other viscous fluids (e.g., gas or liquid) are a dominant loss mechanism in a MEMS device. In a typical MEMS accelerometer application, a MEMS accelerometer is packaged in a cavity with air or an inert gas, which provides damping. The time domain response of an ideal accelerometer output follows the input instantaneously, without any error. A practical accelerometer output lags the input. An under-damped device (i.e., a device having Q>0.5) has a faster response time than over-damped devices (i.e., a device having Q<0.5). However under-damped devices exhibit overshoot and ringing, which increase as the speed and quality factor of the system increases, i.e., the settling time of the system increases with increases in Q. Substantial overshoot and ringing may be catastrophic in some applications (e.g., feedback control systems). In general, high Q devices exhibit a large amount of motion at $f_o$. Such large amounts of motion can cause a proof mass to hit anchored portions of the accelerometer, causing the proof mass to get stuck or damage the accelerometer. In a typical MEMS accelerometer, the amount of damping is controlled by the gas pressure inside the accelerometer package.

Figure 3A:
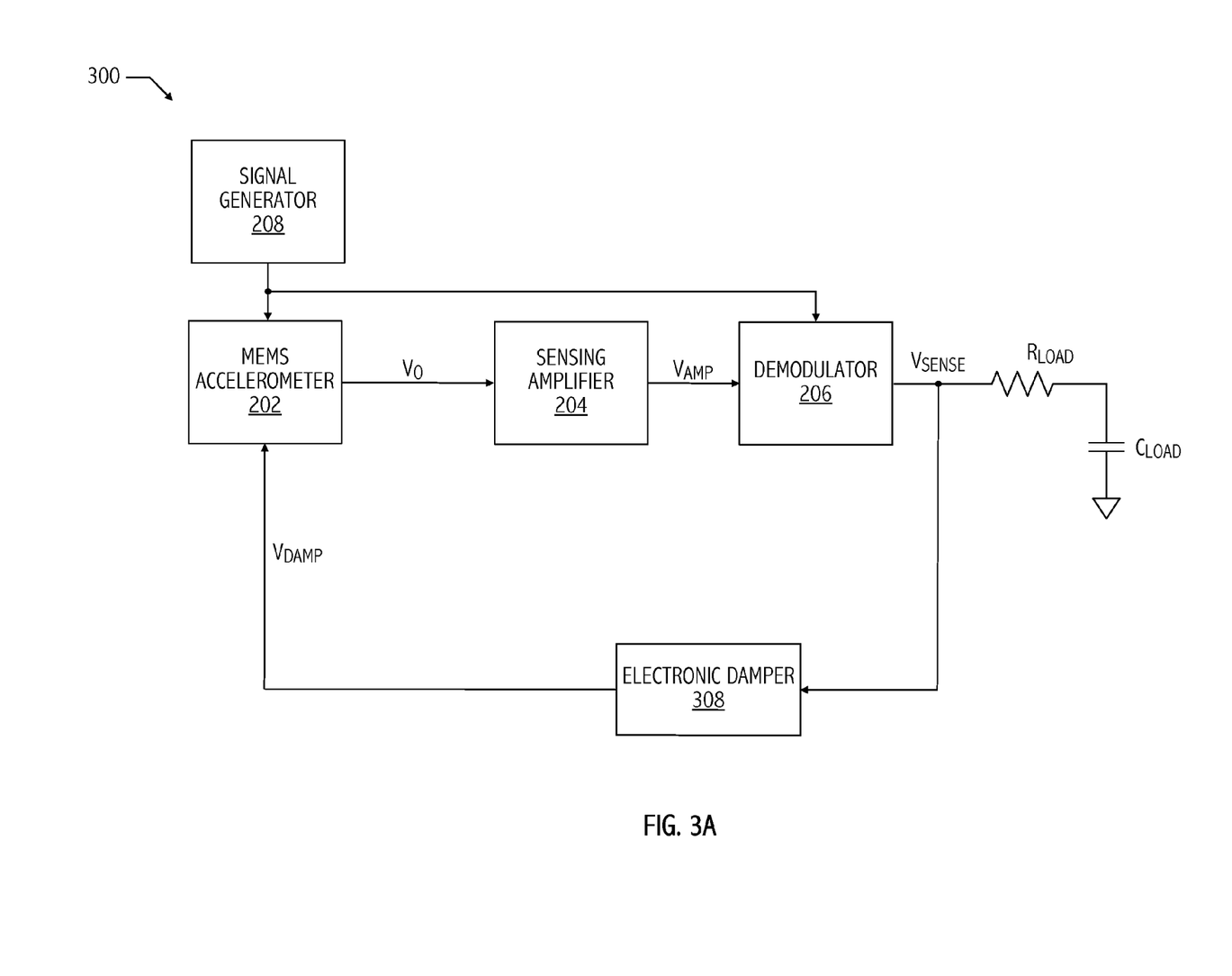
FIG. 3A illustrates a functional block diagram of a MEMS accelerometer system including an electronic damper consistent with at least one embodiment of the invention.
Figure 7:
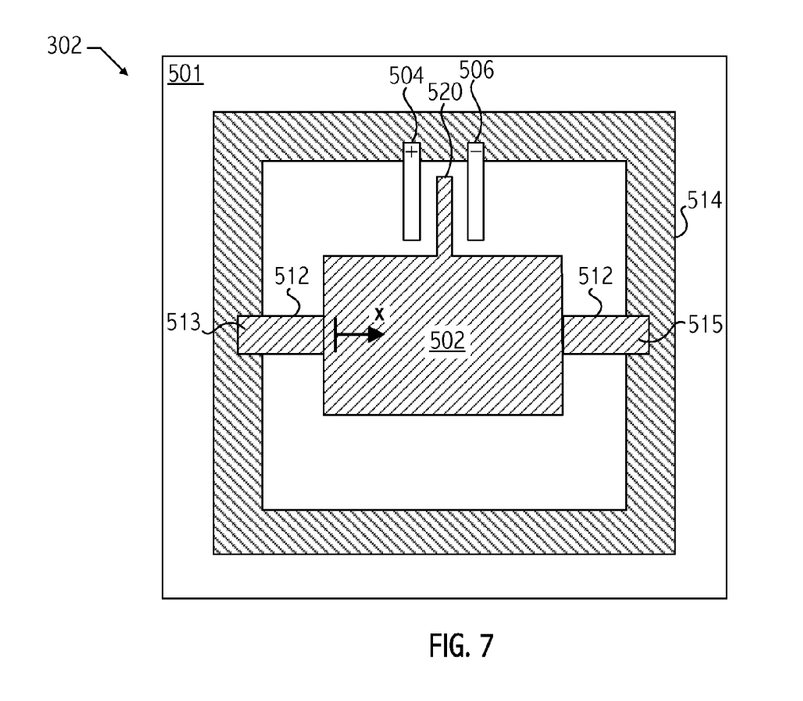
FIG. 7 illustrates an exemplary MEMS accelerometer device consistent with at least one embodiment of the invention.

Referring to FIG. 7, in at least one embodiment, MEMS accelerometer 202 is a capacitive accelerometer, which may be formed as a separate MEMS device or formed as part of an integrated circuit using a MEMS manufacturing process that is compatible with complementary metal-oxide-semiconductor (CMOS) integrated circuit or other integrated circuit manufacturing processes. In at least one embodiment, MEMS accelerometer 202 includes a mass (e.g., mass 502) suspended from a substrate of the integrated circuit (e.g., substrate 501) using flexible beams (e.g., beams 512) anchored on one end to the substrate. In at least one embodiment of MEMS accelerometer 202, a parallel plate capacitor is formed by capacitor fingers 504 and 506 of a frame of accelerometer 202 (e.g., frame 514) and capacitor finger 520 of mass 502. Although only one parallel plate capacitor is shown, other embodiments of MEMS accelerometer 202 include multiple parallel plate capacitors coupled in parallel. In at least one embodiment of MEMS accelerometer 202, a displacement measurement is based on measuring an AC current of the capacitive system. In at least one embodiment of MEMS accelerometer 202, a DC bias signal and AC excitation signal are applied to a first electrode (e.g., capacitor fingers 504 and 506, which are configured to receive a differential signal) and changes in capacitance resulting from displacements of the mass 502 are measured based on a signal (e.g., $V_O$ of FIG. 3) received from a second electrode (e.g., terminal 513 or 515 of MEMS accelerometer 202 of FIG. 7). In at least one embodiment of MEMS accelerometer 202, the frequency of the AC signal is higher than the frequency of capacitance variations. The device illustrated in FIG. 7 is exemplary only and other suitable MEMS accelerometer structures having different dimensions or using different sensing techniques may be used.

In at least one embodiment, MEMS accelerometer 202 is sealed in a low pressure gas environment (e.g., using an inert gas), which reduces or eliminates any air from the cavity, resulting in a pressure substantially less than (e.g., at least one order of magnitude below) atmospheric pressure (e.g., pressure in the range of milli-Torrs). For example, in some applications (e.g., a MEMS gyroscope application), a MEMS sensor (e.g., accelerometer) is packaged along with another MEMS device that requires a high Q (e.g., a resonator). Thus, in those applications, the MEMS accelerometer is packaged in a low pressure gas environment and operated at lower pressure to reduce the viscous effects on Q of one or more other MEMS devices in the same cavity. With little or no natural damping, in response to a jolt or excitation of resonance of a mass in an accelerometer, the mass may move beyond an intended range of motion. The absence of air reduces or eliminates the damping of the mass in the accelerometer, thereby increasing the associated Q (e.g., to approximately 5,000<Q<approximately 20,000 from a target of approximately Q<10, for an exemplary application), reducing the bandwidth, and increasing the settling time of the system.

Figure 3B:
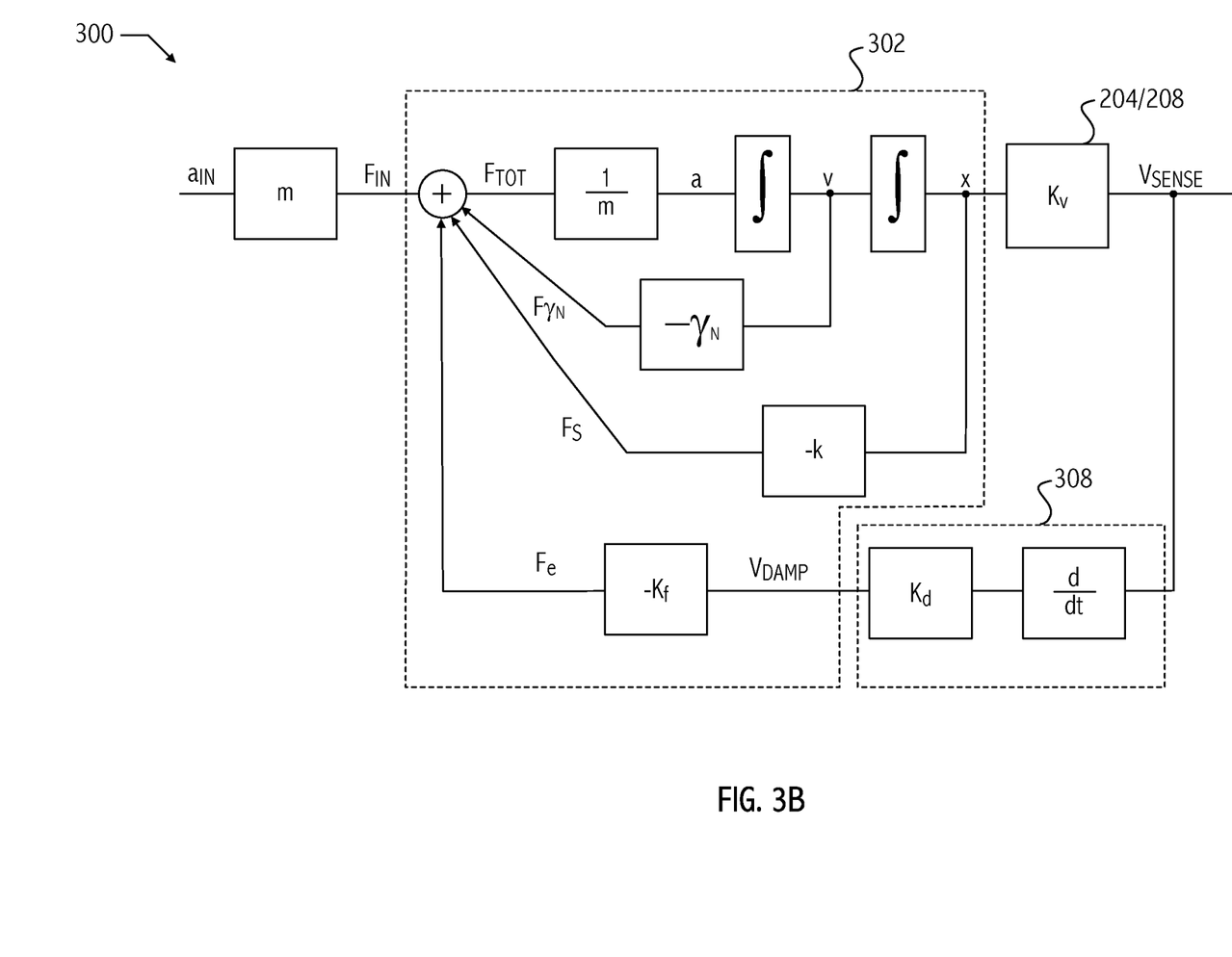
FIG. 3B illustrates another representation of the MEMS accelerometer system including an electronic damper of FIG. 3A.
Figure 3C:
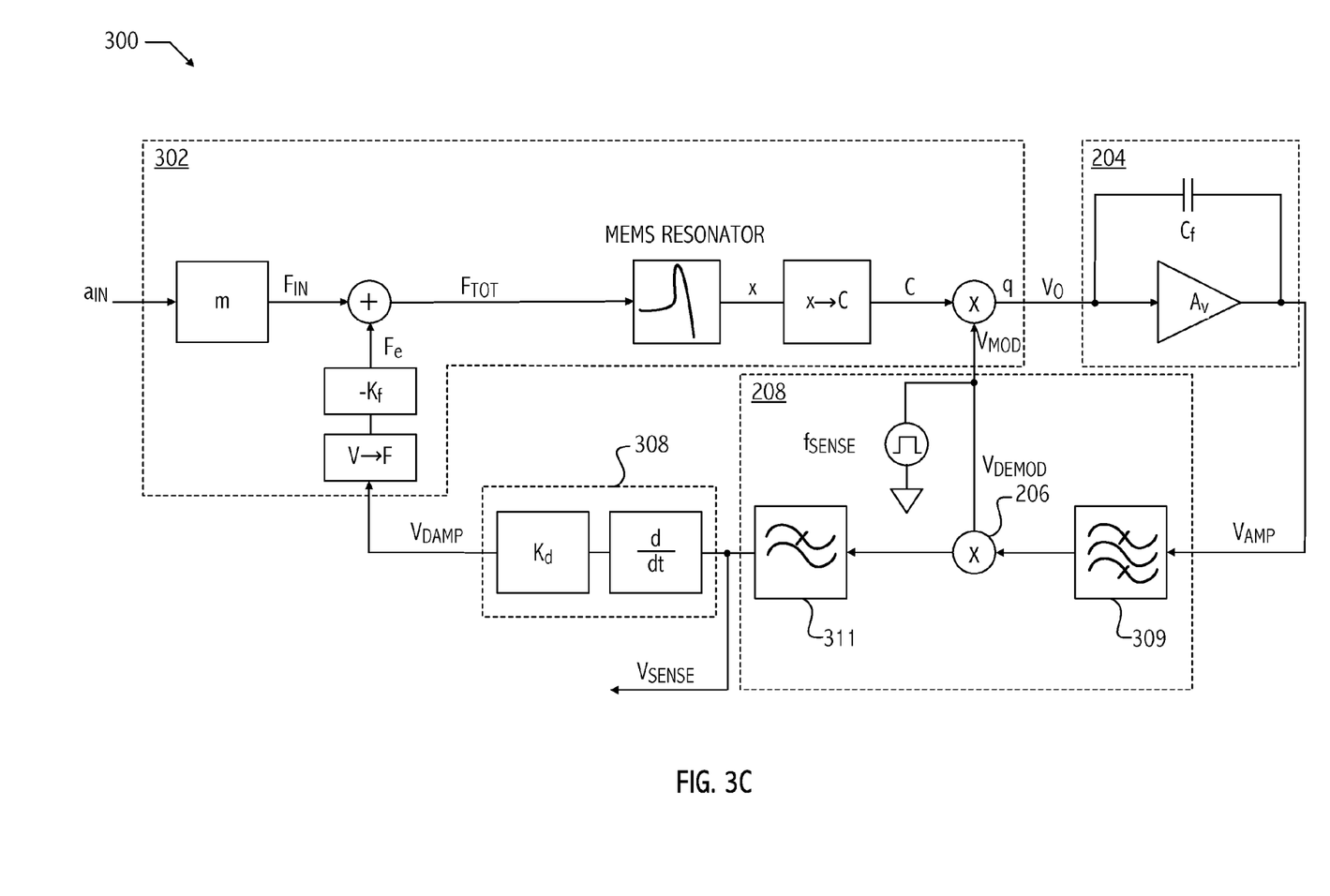
FIG. 3C illustrates another representation of the MEMS accelerometer system including an electronic damper of FIG. 3A.

Referring to FIGS. 3A, 3B, and 3C, a technique for increasing damping of the motion of a resonating mass or adjusting the electromechanical bandwidth of a MEMS device damps movements of the mass in response to a feedback control signal based on sensed displacements of the mass with respect to a frame (e.g., substrate) of the MEMS device. In at least one embodiment of a MEMS system (e.g., MEMS system 300) an electronic damper module (e.g., electronic damper 308) generates a control signal (e.g., $V_{DAMP}$) configured to electronically control the damping of MEMS accelerometer 202, which in at least one embodiment is packaged in a low-pressure environment. As discussed above with respect to the force equation, the damping force generated based on $V_{SENSE}$ is proportional to mass velocity. Accordingly, electronic damper 308 generates $V_{DAMP}$ configured to apply to the mass of MEMS accelerometer 202 a force (e.g., force $F_e$) that is proportional to the velocity of the mass:

$$F_e = \gamma_e \dot{x},$$

where $\gamma_e$ is an electronic damping coefficient (e.g., $\gamma_e = K_v \times K_d \times K_f$, where $K_v$ is a gain associated with sensing amplifier 204 and demodulator 208, $K_d$ is a gain associated with electronic damper 308, and $K_f$ is an electromechanical transduction factor associated with MEMS accelerometer 202) and $\dot{x}$ is the velocity of the mass, which is the derivative with respect to time of a signal proportional to the displacement of the mass (i.e., $\dot{x} \propto dV_{SENSE}/dt = dx/dt = v$). In addition, note that $$\ddot{x} = \frac{d^2 x}{dt^2} = a,$$

which is the acceleration of the mass. In at least one embodiment of electronic damper 308, the damping control signal, $V_{DAMP}$, corresponds to an electronic damping coefficient having a magnitude less than one (i.e., $\gamma_e < 1$). In at least one embodiment of electronic damper 308, the damping control signal corresponds to an electronic damping coefficient having a greater damping force than a damping force due to any fluid in the cavity surrounding the mass (e.g., the damping force of any fluid in the low-pressure environment). In at least one embodiment of electronic damper 308, the damping control signal corresponds to an electronic damping coefficient having a magnitude less than the magnitude of air damping.

Figure 4A:
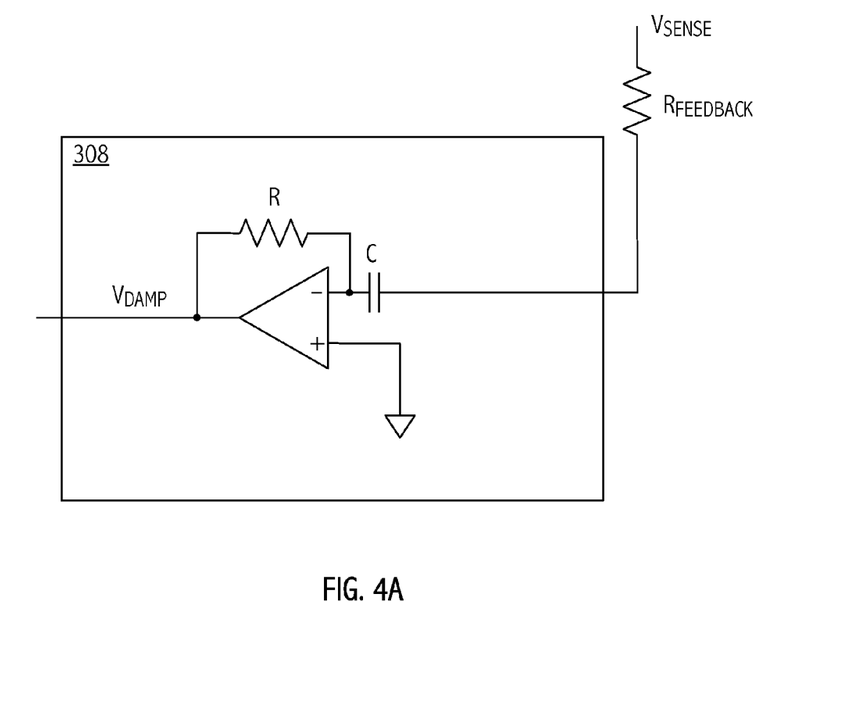
FIGS. 4A and 4B illustrate circuit diagrams of electronic damping modules consistent with various embodiments of the invention.
Figure 4B:
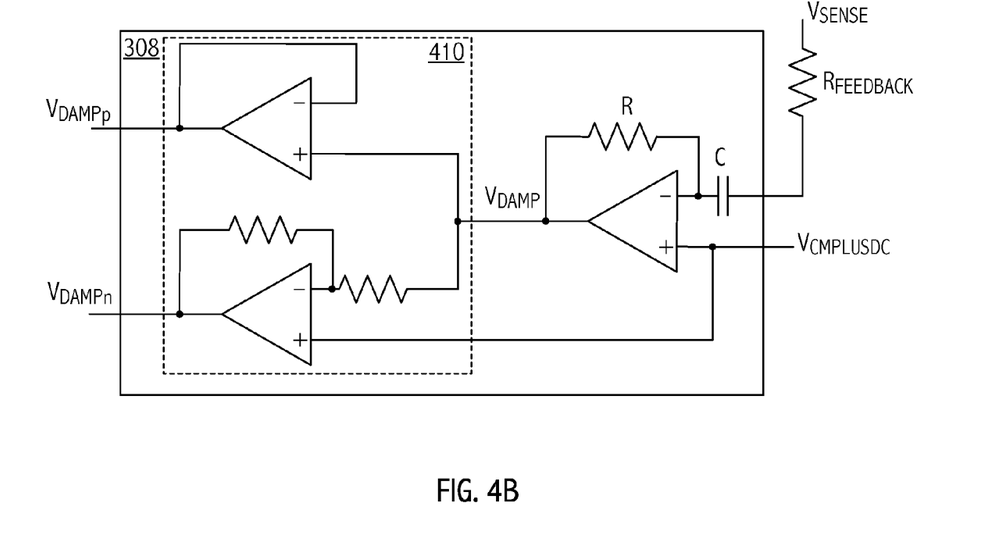

In at least one embodiment of MEMS system 300, electronic damper 308 receives the sensed voltage (e.g., $V_{SENSE}$), which is proportional to the displacement of the mass, and differentiates the signal with respect to time to generate the damping control signal:

$$V_{DAMP} = -K_d \frac{dV_{SENSE}}{dt},$$

where $K_d$ is a constant defined by a particular implementation of electronic damper 308. Referring to FIG. 4A, in at least one embodiment, electronic damper 308 includes an inverting differentiator that differentiates $V_{SENSE}$ over time, i.e., $$V_{DAMP} = -RC \frac{dV_{SENSE}}{dt},$$

where the resistance R and the capacitance C are determined by the target frequency range (i.e., bandwidth) of the signal. In at least one embodiment of electronic damper 308, one or more additional resistors (e.g., $R_{FEEDBACK}$) are included to introduce a zero in the feedback transfer function (i.e., a pole in the forward transfer function) to improve stability of the control loop. Referring to FIG. 4B, in at least one embodiment of MEMS system 300, MEMS accelerometer 202 is configured to generate and receive differential signals. Accordingly, embodiments of MEMS system 300 include a differential to single-ended circuit that provides a single-ended version of the output of MEMS accelerometer 202 and a voltage signal having a level that is the common mode voltage plus a DC voltage level. In at least one embodiment of MEMS system 300, MEMS accelerometer 202 is configured to receive a differential damping control signal. Accordingly, electronic damper 308 provides a differential control signal (e.g., $V_{DAMPp}$ and $V_{DAMPn}$). In at least one embodiment, electronic damper 308 includes single-ended to differential signal conversion circuitry (e.g., circuit 410) and receives a voltage level (e.g., $V_{CMPLUSDC}$) that is the common mode voltage plus a DC voltage of a differential signal output by MEMS device 202. Other embodiments of MEMS system 300 include additional or different circuits. In at least one embodiment of MEMS system 300, rather than applying a damping control signal generated using continuous time feedback, a digital solution and/or switched capacitor implementation may be applied. For example, in at least one embodiment, electronic damper 308 includes an analog-to-digital converter and digital circuitry that generates $V_{DAMP}$ based on a digitally-computed derivative of a digital version of $V_{SENSE}$. Referring back to FIGS. 3A, 3B, and 3C, in addition, note that in other embodiments of system 300, one or more filters are included (e.g., a bandpass filter 309 that limits the frequency band of $V_{AMP}$ and/or a low-pass filter 311 of FIG. 3C that limits the frequency band of $V_{SENSE}$).

Figure 5:
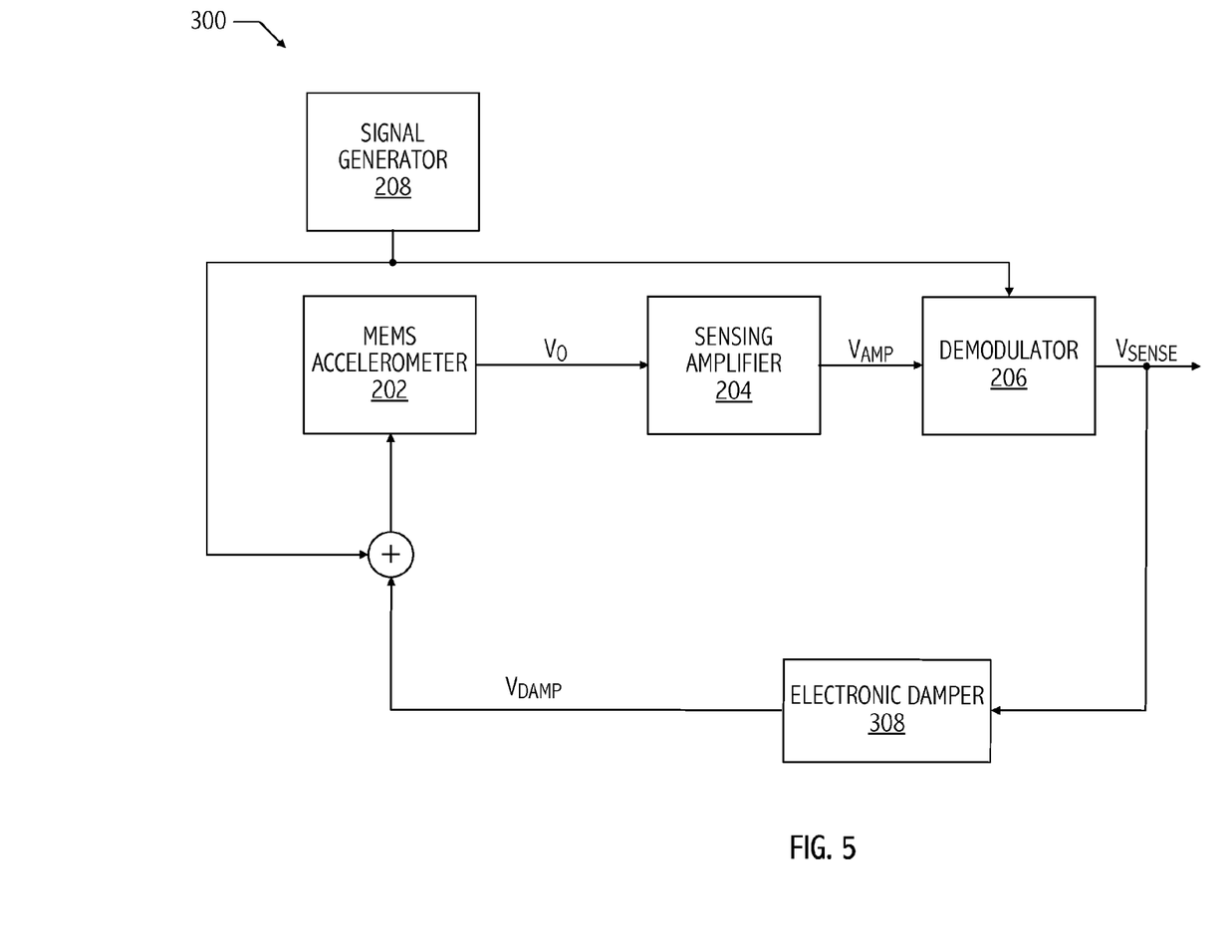
FIG. 5 illustrates a functional block diagram of a MEMS accelerometer system including an electronic damper consistent with at least one embodiment of the invention.
Figure 8:
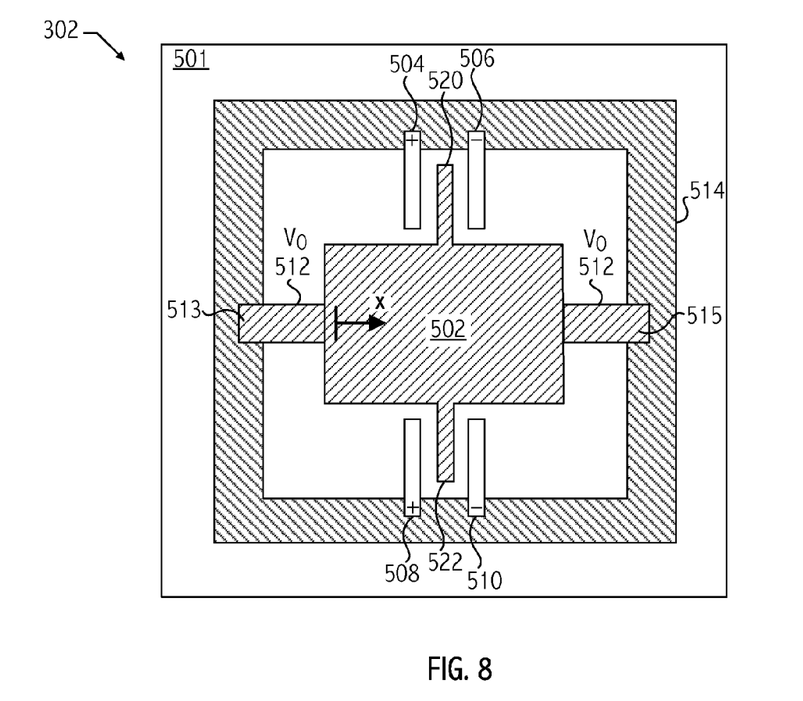
FIG. 8 illustrates an exemplary MEMS accelerometer device consistent with at least one embodiment of the invention.

Still referring to FIGS. 3A, 3B, and 3C, in at least one embodiment of MEMS system 300, MEMS accelerometer 202 receives the damping control signal and applies it to a capacitive transducer (e.g., a parallel plate finger capacitor or comb drive) that generates a damping force (i.e., a force proportional to the velocity of the proof mass) on the proof mass. Referring to FIG. 8, in at least one embodiment, MEMS accelerometer 202 includes electrodes (e.g., capacitor fingers 508 and 510) corresponding to a separate capacitive transducer (e.g., the capacitive transducer formed by stationary capacitor fingers 508 and 510 of frame 514 and finger 522 of mass 502) that applies that damping force to the mass separate from an electrode that applies the AC excitation signal to MEMS accelerometer 202. Referring to FIGS. 5 and 7, in at least one embodiment, MEMS accelerometer 202, the additional electrodes are excluded and one electrode applies both the AC excitation signal and the damping force to MEMS accelerometer 202. That is, MEMS accelerometer 202 is configured to receive the damping control signal in combination with the AC excitation signal on the same electrodes (e.g., the electrode formed by capacitor fingers 504 and 506, which is configured to receive a differential signal). Accordingly, system 300 includes a combining circuit that combines the damping control signal with the AC excitation signal.

Figure 6A:
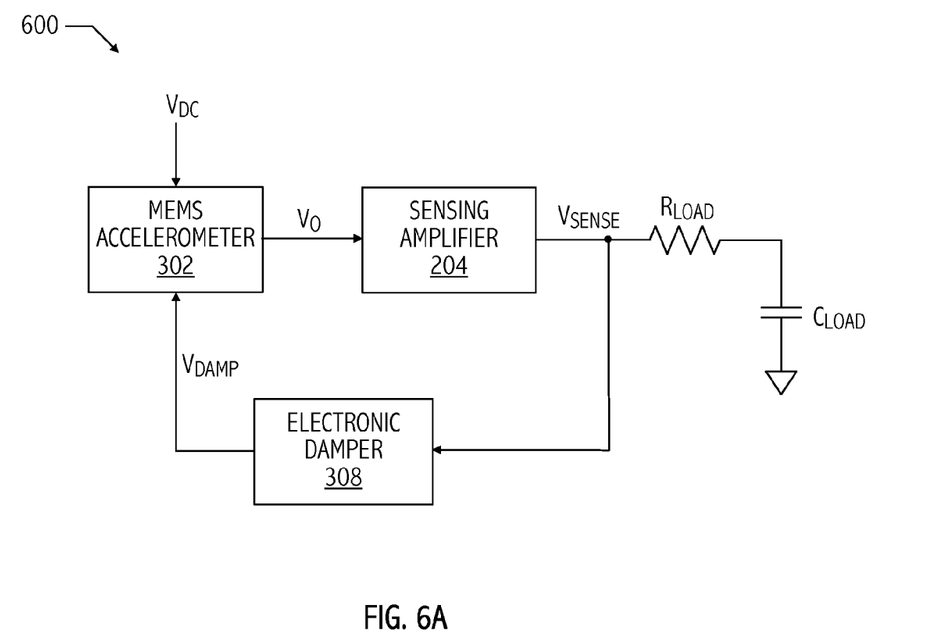
FIG. 6A illustrates a functional block diagram of a resonant MEMS accelerometer system including an electronic damper consistent with at least one embodiment of the invention.
Figure 6B:
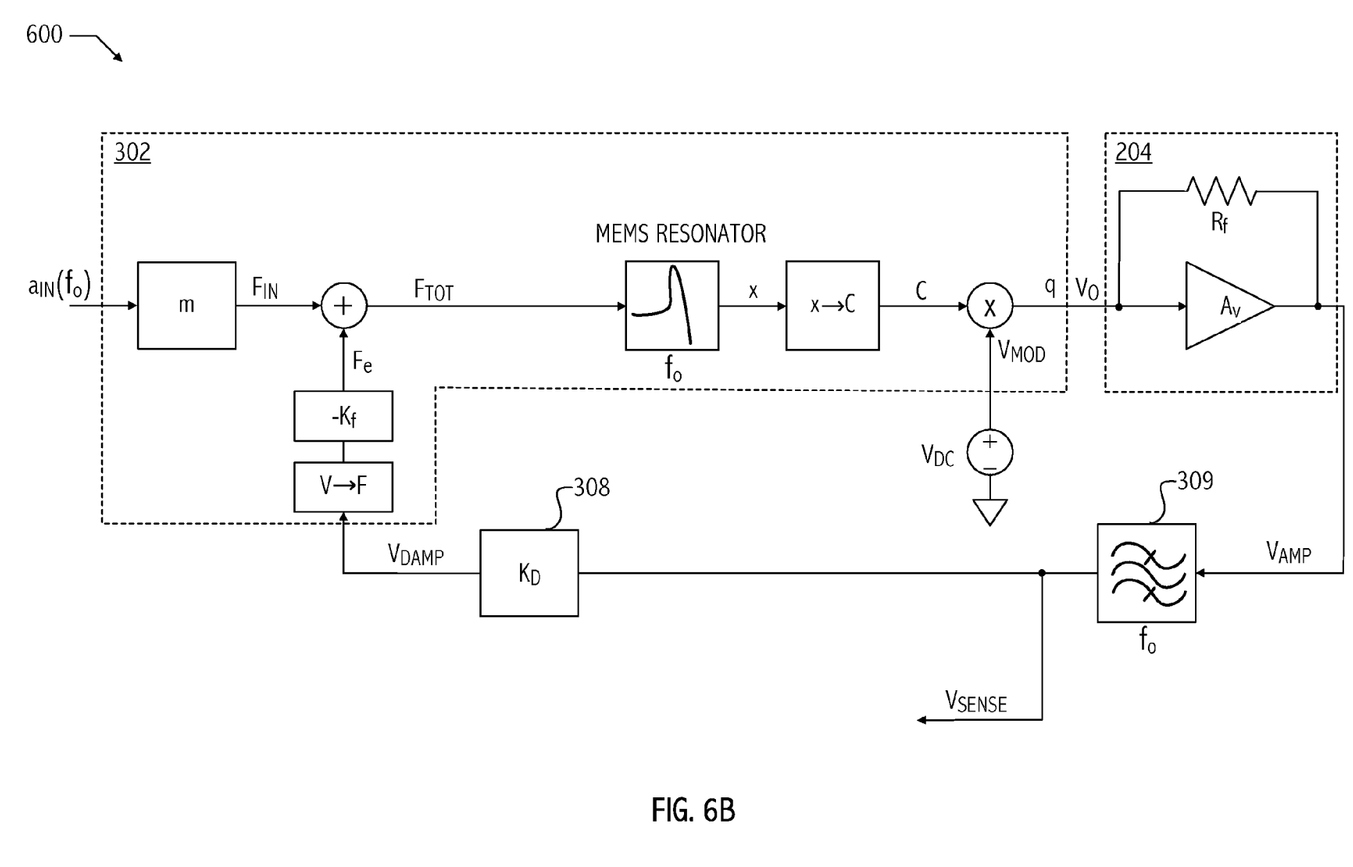
FIG. 6B illustrates another representation of the resonant MEMS accelerometer system including an electronic damper of FIG. 6A.

The embodiments of FIGS. 3A, 3B, 3C, and 5 sense displacement of the mass of the accelerometer and use an electronic damper that generates a damping signal proportional to the velocity of the mass by determining the derivative of the sensed displacement signal. Referring to FIGS. 6A and 6B, in at least one embodiment of the electronic damping technique, a MEMS accelerometer (e.g., MEMS accelerometer 302) maintains a constant voltage on a capacitor formed by a mass and the frame (e.g., by applying a constant DC voltage, $V_{DC}$, to the electrodes of MEMS accelerometer 302) and generates the output voltage, $V_O$, which is proportional to a velocity of the mass of the accelerometer. In at least one embodiment of system 600, the accelerometer is driven at resonance (i.e., resonating at frequency ($\omega_0$). The output voltage $V_O$ is proportional to a motional current that indicates a rate of change of capacitance of MEMS accelerometer 302. In at least one embodiment of system 600, an amplifier (e.g., sensing amplifier 204) gains that output voltage and provides the amplified output signal as the sensor output (e.g., $V_{SENSE}$) having voltage levels proportional to the velocity of the mass. In such embodiments, electronic damper 308 provides an electronic damping signal that is proportional to the sensed velocity measurement. In at least one embodiment, a filter (e.g., filter 309) having a pass band centered around the resonant frequency of MEMS accelerometer 302 limits the frequency band of the amplified output signal to thereby generate $V_{SENSE}$. In at least one embodiment, electronic damper 308 introduces a gain of $K_d$ before providing the electronic damping control signal, $V_{DAMP}$, to MEMS accelerometer 302.

Figure 9:
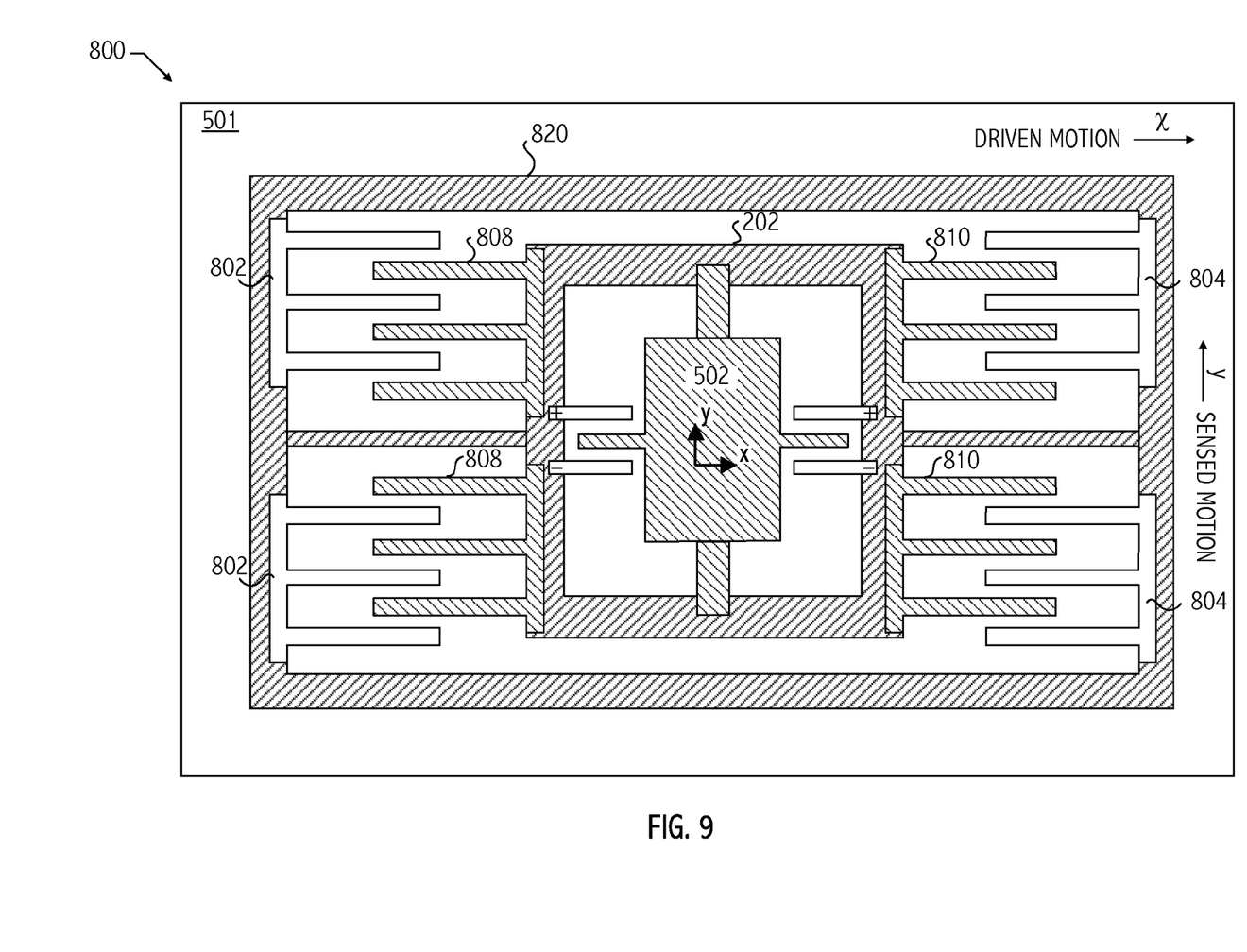
FIG. 9 illustrates an exemplary MEMS gyroscope device consistent with at least one embodiment of the invention.

In at least one embodiment of MEMS system 300, the electronic damping technique is used to decrease the range of motion of a resonating mass to reduce resonant motion of the mass to prevent catastrophic overshoot. In at least one embodiment of MEMS system 300, the electronic damping technique is used to align the bandwidths of two orthogonal modes of operation to have overlapping frequency ranges of operation. Referring to FIG. 9, in an exemplary gyroscope application, a MEMS device (e.g., MEMS gyroscope 800) includes a driver (e.g., comb drive formed by capacitor combs 802 and 808 and capacitor combs 804 and 810) that drives an outer mass (e.g., the mass formed by MEMS accelerometer 202 having a frame suspended from a substrate) to resonate in a first direction (e.g., x-direction) with a first resonant frequency and first bandwidth. In at least one embodiment of MEMS gyroscope 800, a sensor (e.g., accelerometer 202) senses a displacement of an inner mass (e.g., mass 502) in an orthogonal direction (e.g., y-direction) with a second resonant frequency, which is frequency offset from the first resonant frequency, and a second bandwidth. In general, matching the drive mode and sense mode resonant frequencies amplifies the sense mode vibrations by the sense mode resonator quality factor. If the driver and sensor both have narrow bandwidths centered around resonant frequencies that are frequency offset from one another, the sensor may not adequately sense the displacements of the mass. Accordingly, in embodiments of a MEMS system including a MEMS gyroscope having a resonant frequency of a sense mode offset from the resonant frequency of the drive mode, the electronic damping techniques described herein may be used to increase gain of the gyroscope system by widening the bandwidth of the sense mode to overlap a bandwidth of the drive mode (e.g., widen the sensor bandwidth to 100 Hz where the drive motion has a bandwidth of 10 Hz).

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in embodiments in which capacitive sensing is used, one of skill in the art will appreciate that the teachings herein can be utilized with other sensing techniques (e.g., piezoresistive, piezoelectric, optical, magnetic position detection). Although the invention has been described in accelerometer and gyroscope embodiments, one of skill in the art will appreciate that the teachings herein can be applied to systems including other MEMS devices (e.g., other sensor and/or resonator applications). Variations and modifications of the embodiments disclosed herein, may be made based on the description set forth herein, without departing from the scope and spirit of the invention as set forth in the following claims.

What is claimed is:

1. An apparatus comprising:
   a microelectromechanical system (MEMS) device comprising a mass suspended from a substrate, the MEMS device being configured to generate an output signal indicative of motion of the mass with respect to the substrate; and
   a feedback module configured to provide a control signal to the MEMS device, the control signal being based on the output signal, the MEMS device being configured to apply a damping force to the mass in response to the control signal, the control signal being proportional to a velocity of the mass.

2. The apparatus, as recited in claim 1, wherein the output signal is indicative of a displacement of the mass with respect to the substrate and the control signal is generated based on a derivative of the output signal with respect to time.

3. The apparatus, as recited in claim 1, wherein the output signal is indicative of a velocity of the mass with respect to the substrate and the control signal is proportional to the output signal.

4. The apparatus, as recited in claim 1, wherein in response to the damping force, the mass continues to move in response to an inertial force causing the motion and an amplitude of mass displacement gradually decreases.

5. The apparatus, as recited in claim 1, wherein the MEMS device comprises a capacitive actuator configured to apply a force to the mass in response to the control signal.

6. The apparatus, as recited in claim 1, wherein the MEMS device comprises:
   a first set of electrodes configured to sense the displacement; and
   a second set of electrodes configured to apply the damping force to the mass.

7. The apparatus, as recited in claim 6, wherein the second set of electrodes is further configured to apply an excitation signal to the MEMS device.

8. The apparatus, as recited in claim 1, wherein the MEMS device is sealed in a low pressure gas environment.

9. The apparatus, as recited in claim 1, wherein the feedback module comprises:
   a differentiator module configured to generate a signal indicating an approximate derivative of a displacement signal with respect to time, the displacement signal being based on the output signal.

10. The apparatus, as recited in claim 1, wherein the MEMS device comprises:
    a first electrode and a second electrode configured to apply a sensing signal to the MEMS device; and
    a third electrode and a fourth electrode configured to receive the control signal and apply the damping force to the mass.

11. The apparatus, as recited in claim 1, further comprising:
    a demodulator module configured to generate a baseband version of the output signal based on a version of a sensing signal provided to the MEMS device.

12. A method comprising:
    damping a mass suspended from a substrate of a microelectromechanical system (MEMS) device, the damping being based on sensed motion of the mass with respect to a substrate of the MEMS device, the damping comprising applying a damping force to the mass of the MEMS device proportional to a velocity of the MEMS device.

13. The method, as recited in claim 12, wherein the damping comprises:
    generating a feedback signal based on the sensed motion; and
    applying the damping force to the mass of the MEMS device in response to the feedback signal.

14. The method, as recited in claim 12, wherein the damping is substantially greater than a damping force due to any gas in a cavity surrounding the mass.

15. The method, as recited in claim 12, wherein the sensed motion is sensed displacements of the mass with respect to the substrate and the damping comprises:
    generating a derivative with respect to time of the sensed displacements,
    wherein the damping force is proportional to the derivative.

16. The method, as recited in claim 12, wherein the sensed motion is a velocity of the mass with respect to the substrate.

17. The method, as recited in claim 12, further comprising:
    sensing displacements of the mass with respect to the substrate and generating a signal indicative thereof; and
    demodulating the signal from a sensing frequency to a baseband signal and damping the mass is based on the baseband signal.

18. The method, as recited in claim 12, wherein the damping reduces displacements of the mass and the displacements of the mass continue in response to the damping signal, the amplitude of mass displacements gradually decreasing to zero.

19. An apparatus comprising:
    a microelectromechanical system (MEMS) device comprising a mass suspended from a substrate, the MEMS device being configured to sense motion of the mass with respect to a substrate of the MEMS device and configured to apply a damping force to the mass in response to a control signal, the damping force being determined according to a velocity of the mass.

20. The apparatus, as recited in claim 19, further comprising:
    a feedback module configured to generate the control signal based on an indicator of the sensed motion.

21. The apparatus, as recited in claim 1, wherein the MEMS device further comprises electrodes configured to apply the damping force to the mass separately from sensing displacement of the mass and separately from applying any excitation force to the mass.

* * * * *

UNITED STATES PATENT AND TRADEMARK OFFICE
CERTIFICATE OF CORRECTION

PATENT NO. : 8,875,578 B2
APPLICATION NO. : 13/281928
DATED : November 4, 2014
INVENTOR(S) : Eric B. Smith Page 1 of 1

It is certified that error appears in the above-identified patent and that said Letters Patent is hereby corrected as shown below:

In the Specification

In col. 4, line 11, please replace "$\gamma_{tot}\ \gamma_1 + \gamma_2 - \ldots + \gamma_N.$" with --$\gamma_{tot} = \gamma_1 + \gamma_2 + \ldots + \gamma_N.$--

In col. 6, line 9, please replace "$F_e = \gamma_e x \dot{x},$" with --$F_e = \gamma_e \dot{x},$--

Signed and Sealed this
Seventeenth Day of March, 2015

Michelle K. Lee
*Director of the United States Patent and Trademark Office*